United States Patent
Saitou

(10) Patent No.: US 10,230,286 B2
(45) Date of Patent: Mar. 12, 2019

(54) ELECTRIC MOTOR

(71) Applicant: FANUC CORPORATION, Yamanashi (JP)

(72) Inventor: Takeshi Saitou, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 36 days.

(21) Appl. No.: 15/587,704

(22) Filed: May 5, 2017

(65) Prior Publication Data

US 2017/0366071 A1     Dec. 21, 2017

(30) Foreign Application Priority Data

Jun. 17, 2016   (JP) .................................. 2016-120626

(51) Int. Cl.
   H02K 9/06       (2006.01)

(52) U.S. Cl.
   CPC ........... H02K 9/06 (2013.01); *H02K 2213/09* (2013.01)

(58) Field of Classification Search
   CPC .. H02K 9/00; H02K 9/06; H02K 7/00; H02K 7/14; F04D 29/053; F04D 29/70; F01P 7/084; F16D 27/10; F16D 27/112; F16D 48/064
   See application file for complete search history.

(56) References Cited

U.S. PATENT DOCUMENTS

| | | | | |
|---|---|---|---|---|
| 6,000,910 A | * | 12/1999 | Ahn | ...................... F04D 25/105 416/100 |
| 7,472,778 B2 | * | 1/2009 | Boffelli | .................. F01P 7/046 192/48.2 |
| 2005/0205374 A1 | * | 9/2005 | Boffelli | .................. B60K 11/00 192/18 B |
| 2015/0219109 A1 | | 8/2015 | Suwa et al. | |

FOREIGN PATENT DOCUMENTS

| | | |
|---|---|---|
| JP | S47-40959 Y | 12/1972 |
| JP | S56-6959 U | 1/1981 |
| JP | S60-44461 U | 3/1985 |
| JP | S60-62876 U | 5/1985 |
| JP | S61-6686 U | 1/1986 |
| JP | S62-31722 U | 2/1987 |
| JP | H04-190654 A | 7/1992 |
| JP | 2015-146715 A | 8/2015 |

OTHER PUBLICATIONS

Japanese Decision to Grant a Patent, dated Apr. 24, 2018, in corresponding Japan Application No. 2016-120626; 6 pgs.

* cited by examiner

*Primary Examiner* — Tran N Nguyen
(74) *Attorney, Agent, or Firm* — Maier & Maier, PLLC

(57) ABSTRACT

An electric motor includes a stator, a rotor provided rotatably about a predetermined rotational axis line relative to the stator, a cooling fan configured to rotate an impeller through a fan motor fixed to the stator, and a coupling unit configured to detachably couple the rotor and the impeller of the cooling fan. The coupling unit couples the rotor and the impeller (Continued)

while the fan motor is stopped, and decouples the rotor and the impeller after the fan motor starts.

5 Claims, 7 Drawing Sheets

ELECTRIC MOTOR

CROSS-REFERENCE TO RELATED APPLICATIONS

This application claims the benefit of Japanese Patent Application No. 2016-120626, the content of which is incorporated herein by reference.

TECHNICAL FIELD

The present invention relates to an electric motor.

BACKGROUND ART

A conventionally known electronic device (refer to PTL 1, for example) is configured to detect a rotational state, determine whether there is an operation failure, try to activate a fan motor rotating a cooling fan if there is an operation failure, and perform, for example, processing to prompt replacement of the motor if the activation fails. In this manner, the electronic device avoids temporal development of an operation failure of the fan motor due to, for example, bearing defect and dirt clogging inside, which then potentially prevents execution of appropriate cooling.

CITATION LIST

Patent Literature

{PTL 1}
Japanese Unexamined Patent Application, Publication No. 2015-146715

SUMMARY OF INVENTION

An aspect of the present invention provides an electric motor including a stator, a rotor provided rotatably about a predetermined rotational axis line relative to the stator, a cooling fan configured to rotate an impeller through a fan motor fixed to the stator, and a coupling unit configured to detachably couple the rotor and the impeller of the cooling fan. The coupling unit couples the rotor and the impeller while the fan motor is stopped, and decouples the rotor and the impeller after the fan motor starts.

DESCRIPTION OF EMBODIMENTS

The following describes an electric motor 1 according to a first embodiment of the present invention with reference to the accompanying drawings.

Figure 1:
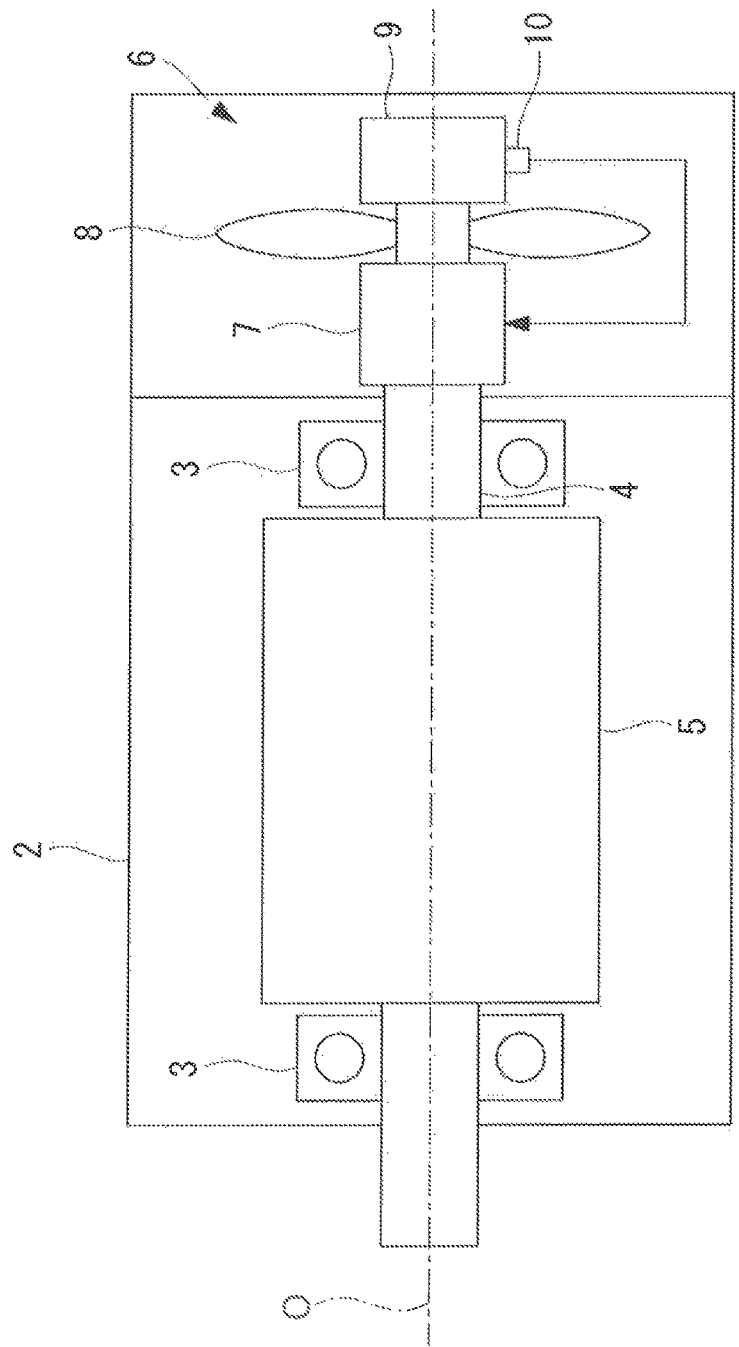
FIG. 1 is a pattern diagram illustrating an electric motor according to a first embodiment of the present invention.

As illustrated in FIG. 1, the electric motor 1 according to the present embodiment includes a stator 2, a rotor 5 including a shaft 4 supported rotatably about a rotational axis line O in the stator 2 by a bearing 3, a cooling fan 6 disposed at one end of the rotor 5 in the direction of the rotational axis line O, and a coupling unit 7 configured to detachably couple the cooling fan 6 with the shaft 4 of the rotor 5.

The cooling fan 6 includes an impeller 8 supported rotatably about an axis line coaxial with the rotational axis line O, a fan motor 9 configured to rotate the impeller 8, and a rotation sensor (rotation detection unit) 10 configured to detect rotation of the fan motor 9.

The coupling unit 7 is an electromagnetic clutch capable of selectively coupling and decoupling the fan motor 9 of the cooling fan 6 and the shaft 4 of the rotor 5 in response to supply of a voltage signal. The coupling unit 7 is configured to receive output from the rotation sensor 10. With this configuration, when rotation of the fan motor 9 is detected by the rotation sensor 10, the coupling unit 7 as an electromagnetic clutch is electrically controlled by a signal of the detection to decouple the fan motor 9 and the shaft 4 of the rotor 5.

The following describes control of the electric motor 1 thus configured according to the present embodiment.

The electric motor 1 according to the present embodiment allows rotation of a load connected with the rotor 5 to perform work when the rotor 5 is rotated about the rotational axis line O relative to the stator 2.

Along with the rotation of the rotor 5, the fan motor 9 is actuated to rotate the impeller 8 so that external air is sucked by the impeller 8 to remove heat generated at the stator 2 and the rotor 5.

In this case, when dust and mist are sucked together with the external air sucked upon the actuation of the cooling fan 6, the dust and mist accumulates and potentially immobilizes the cooling fan 6 while the cooling fan 6 is stopped.

According to the present embodiment, while no rotation of the fan motor 9 is detected by the rotation sensor 10, the rotor 5 and the impeller 8 are coupled by the electromagnetic clutch as the coupling unit 7, and thus the immobilization can be cancelled to rotate the impeller 8. Specifically, the fan motor 9 of the cooling fan 6 can only generate low torque enough to rotate the impeller 8, but high torque generated by the rotor 5 can be used to rotate the impeller 8, thereby easily cancelling the immobilization of the cooling fan 6.

When rotation of the fan motor 9 is detected by the rotation sensor 10, a signal of the detection is input to the coupling unit 7, and accordingly, the coupling unit 7 as an electromagnetic clutch is electrically controlled to decouple the rotor 5 and the impeller 8. This prevents the rotor 5 from being encumbered by rotation of the impeller 8 of the cooling fan 6 by the fan motor 9, which advantageously allows sufficient rotation of the rotor 5 and sufficient removal of heat generated at the rotor 5 and the stator 2.

Once cancelled, the immobilization of the cooling fan 6 does not occur while the impeller 8 is rotating, and thus the cooling fan 6 can continue cooling the rotor 5 and the stator 2.

The electrically controlled electromagnetic clutch can more reliably perform selective coupling and decoupling between the rotor 5 and the impeller 8 depending on whether a detection signal output from the rotation sensor 10 is received.

The following describes an electric motor 11 according to a second embodiment of the present invention with reference to the accompanying drawings.

In the description of the present embodiment, any component having a configuration common to that of the electric motor 1 according to the first embodiment is denoted by an identical reference sign, and description thereof will be omitted.

The electric motor 11 according to the present embodiment is different from the electric motor 1 according to the first embodiment in the structure of a coupling unit 12.

Figure 2:
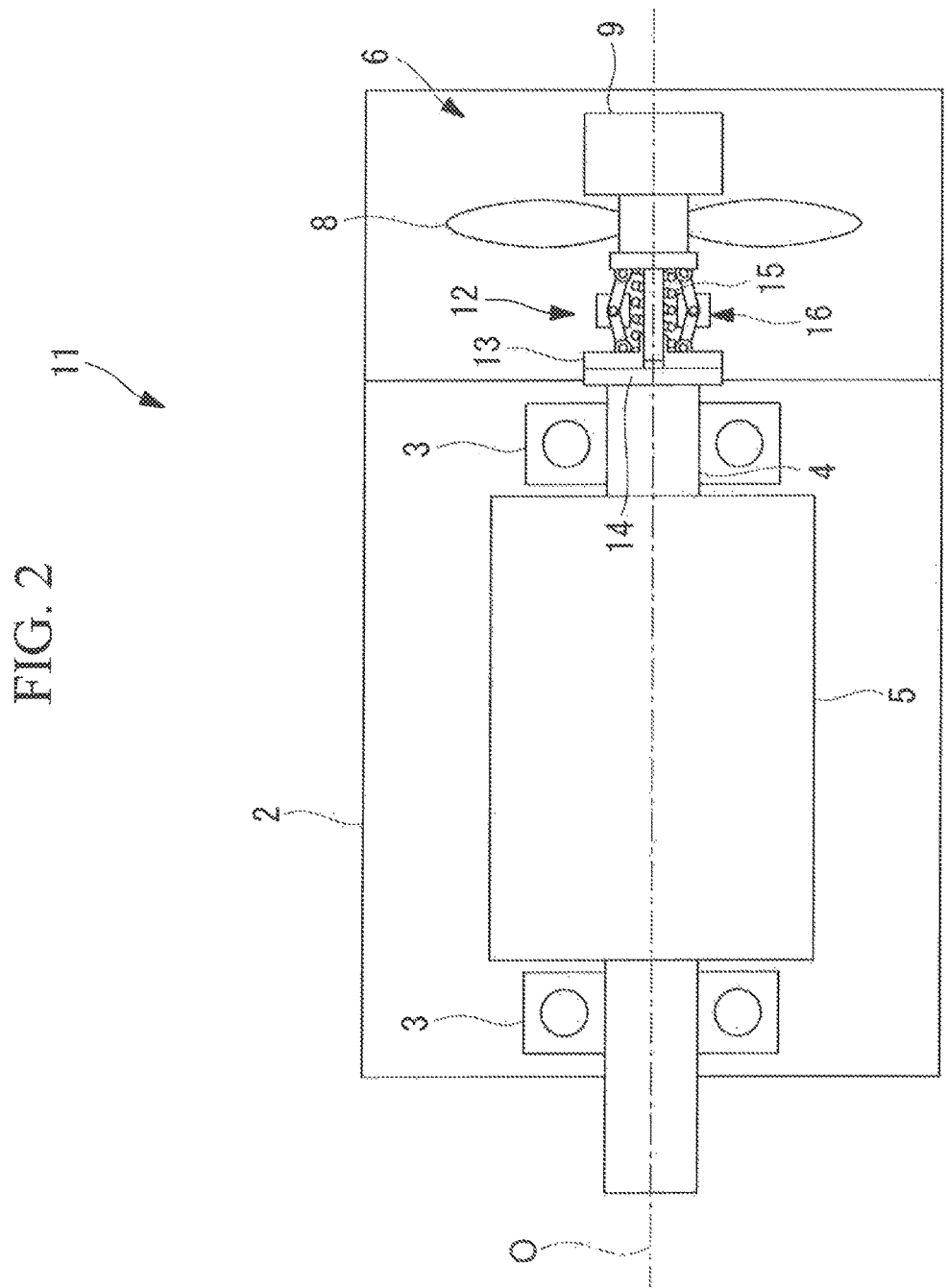
FIG. 2 is a pattern diagram illustrating an electric motor according to a second embodiment of the present invention.

As illustrated in FIG. 2, the coupling unit 12 includes a movable body (movable unit) 13 provided movable along the rotational axis line O of the rotor 5 and the impeller 8 which are coaxially disposed with each other, a friction contact unit 14 fixed to an end part of the rotor 5 and configured to transfer the torque of the rotor 5 to the movable body 13 by friction when being in close contact with the movable body 13 having moved close, a coil spring (energizing member) 15 configured to apply energizing force to press the movable body 13 against the friction contact unit 14, and a decoupling mechanism 16 configured to move the movable body 13 in a direction departing from the friction contact unit 14 against the energizing force of the coil spring 15.

Figure 3:
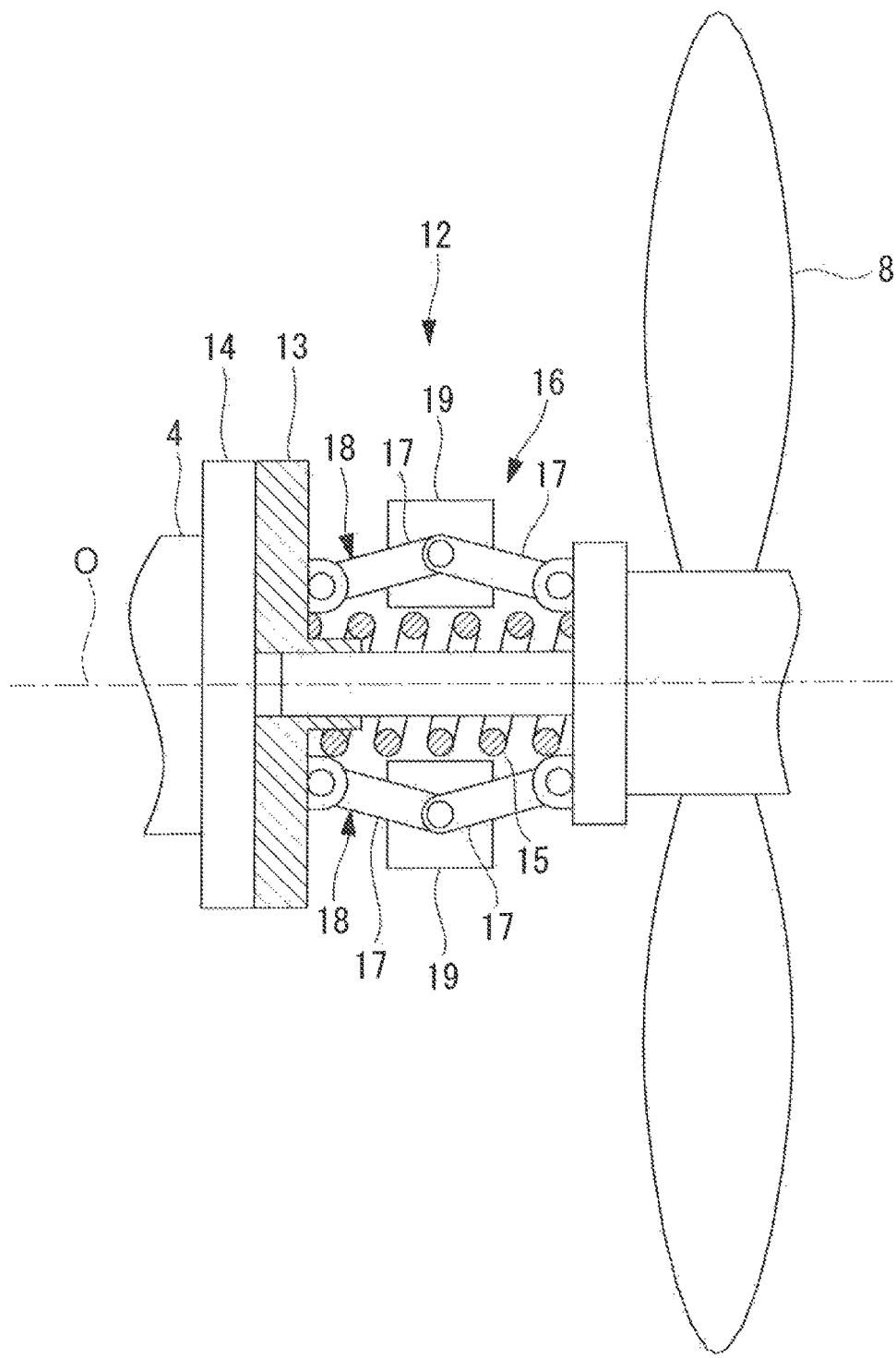
FIG. 3 is a diagram illustrating a coupled state at a coupling unit of the electric motor in FIG. 2.

As illustrated in FIG. 3, the decoupling mechanism 16 includes two pairs of link mechanisms 18 each including a pair of link members 17, first ends of which are swingably connected with the movable body 13 and the impeller 8, respectively, and second ends of which are swingably coupled with each other, and a weight 19 disposed near the coupling part of the two link members 17. The two pairs of link mechanisms 18 are disposed opposite to each other with respect to the rotational axis line O, and each is configured to swing to move the coupling part of the two link members 17 radially outward when the movable body 13 moves in a direction departing from the friction contact unit 14.

Figure 4:
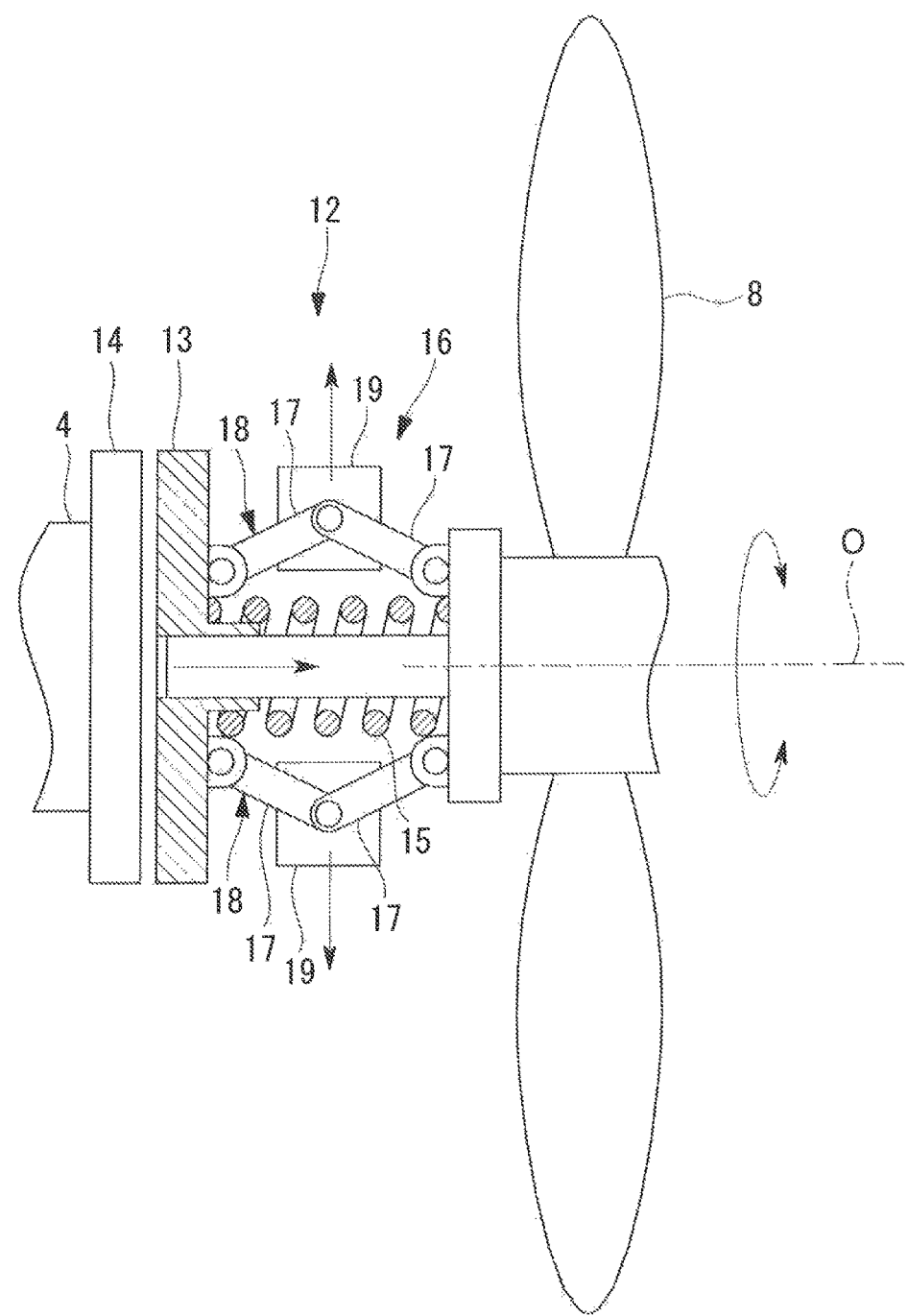
FIG. 4 is a diagram illustrating a decoupled state at the coupling unit of the electric motor in FIG. 2.

With this configuration, when the impeller 8 rotates, the decoupling mechanism 16 rotates integrally with the impeller 8 as illustrated in FIG. 4 to apply radially outward centrifugal force to the two weights 19. Accordingly, the two link members 17 are swung to move the coupling parts of the two link members 17 radially outward. As a result, the movable body 13 is moved in the direction departing from the friction contact unit 14 against the energizing force of the coil spring 15.

In the electric motor 11 thus configured according to the present embodiment, when the fan motor 9 of the cooling fan 6 is stopped and the rotor 5 is stopped or rotating at low speed as illustrated in FIG. 3, no sufficient centrifugal force applies to the weights 19, and thus the movable body 13 is maintained in close contact with the friction contact unit 14 by the energizing force of the coil spring 15. Thus, when the rotor 5 and the impeller 8 are coupled by the coupling unit 12 and the impeller 8 is immobilized, the immobilization is cancelled by rotation of the rotor 5 at high torque, thereby allowing the impeller 8 to rotate.

When the fan motor 9 is actuated to rotate the impeller 8 at high speed, the weights 19 are moved radially outward by centrifugal force applied thereto as illustrated in FIG. 4, so that the two pairs of link mechanisms 18 are bent to move the movable body 13 in the direction departing from the friction contact unit 14. Accordingly, the rotor 5 and the impeller 8 are decoupled to allow the fan motor 9 to rotate the impeller 8 without restriction by the rotor 5, and the rotor 5 to sufficiently remove, without encumbrance by rotation of the impeller 8, heat generated at the rotor 5 and the stator 2.

Thus, the present embodiment can couple and decouple the rotor 5 and the impeller 8 without using any dedicated power nor any dedicated rotation sensor.

In the present embodiment, two pairs of the link mechanisms 18 are provided, but three or more pairs of link mechanisms 18 may be provided when equally disposed about the rotational axis line O.

The above description is made on an exemplary structure with which the movable body 13 is moved in a direction along the rotational axis line O by the centrifugal force that moves the weights 19 radially outward. However, selective coupling and decoupling may be achieved by the movable body 13 that is radially moved by centrifugal force applied to the weights 19, like a click of a chuck radially holding the shaft 4 of the rotor 5.

The following describes an electric motor 21 according to a third embodiment of the present invention with reference to the accompanying drawings.

In the description of the present embodiment, any component having a configuration common to that of the electric motor 1 according to the first embodiment is denoted by an identical reference sign, and description thereof will be omitted.

The electric motor 21 according to the present embodiment is different from the electric motor 1 according to the first embodiment in the structure of a coupling unit 22.

Figure 5:
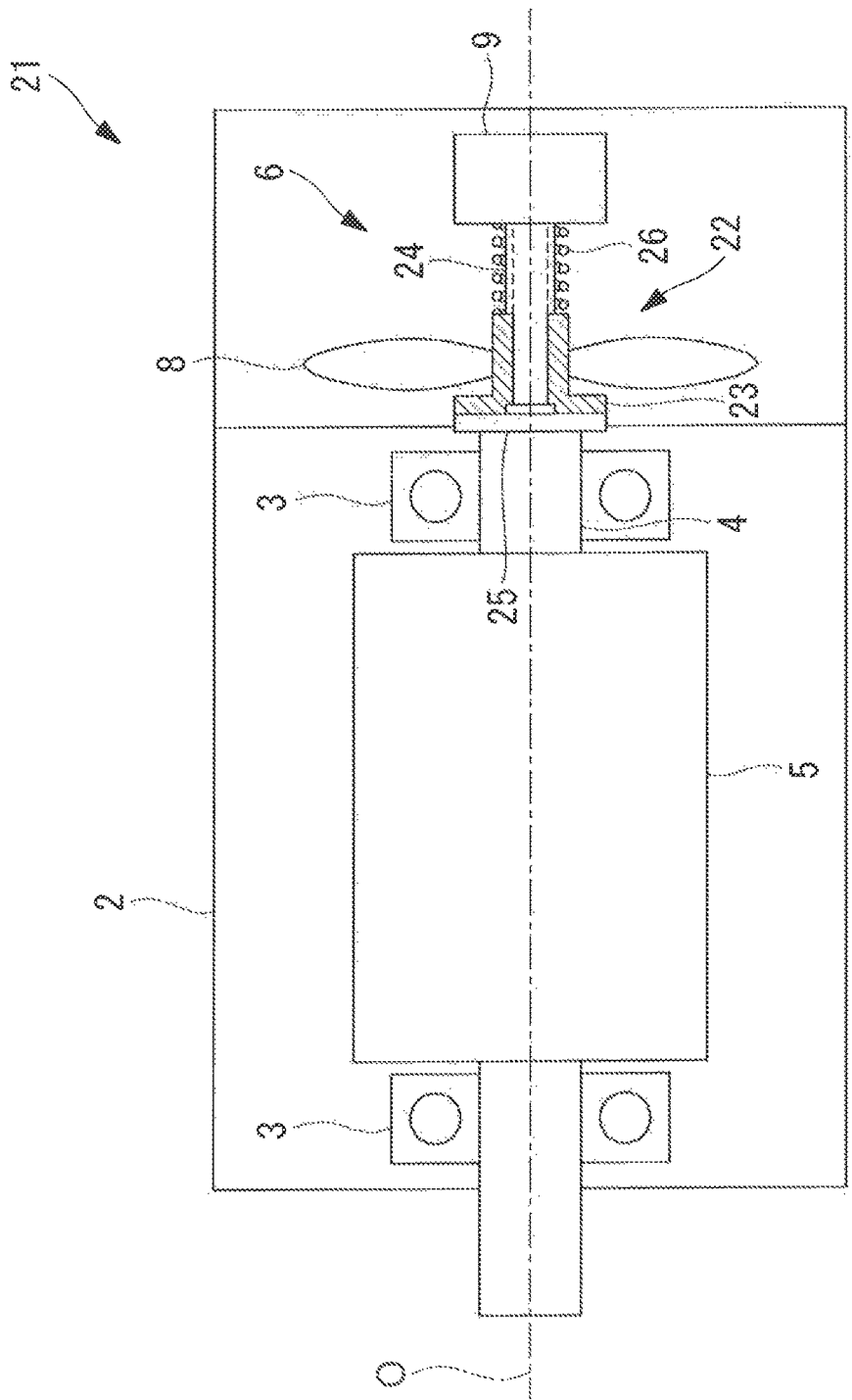
FIG. 5 is a pattern diagram illustrating an electric motor according to a third embodiment of the present invention.
Figure 6:
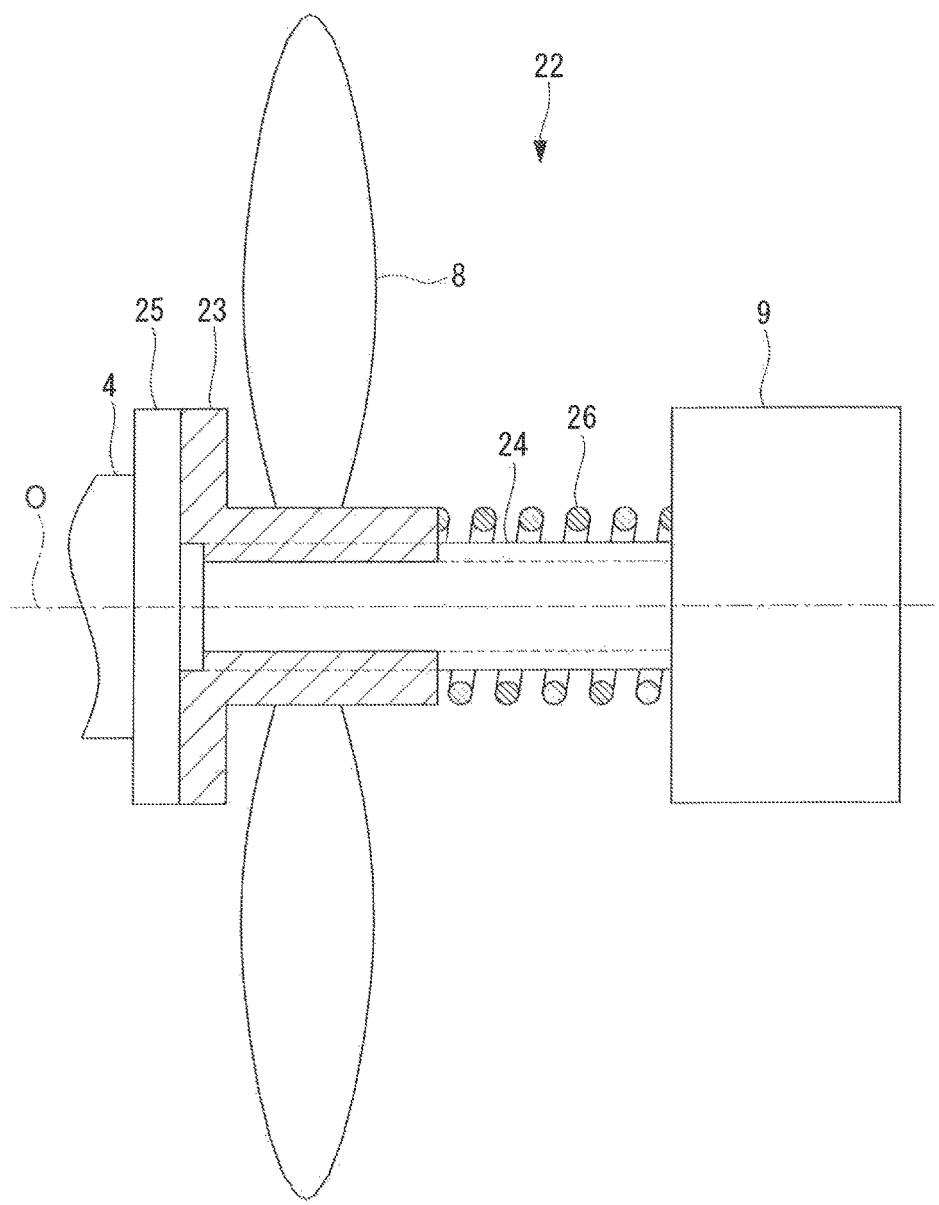
FIG. 6 is a diagram illustrating a coupled state at a coupling unit of the electric motor in FIG. 5.
Figure 7:
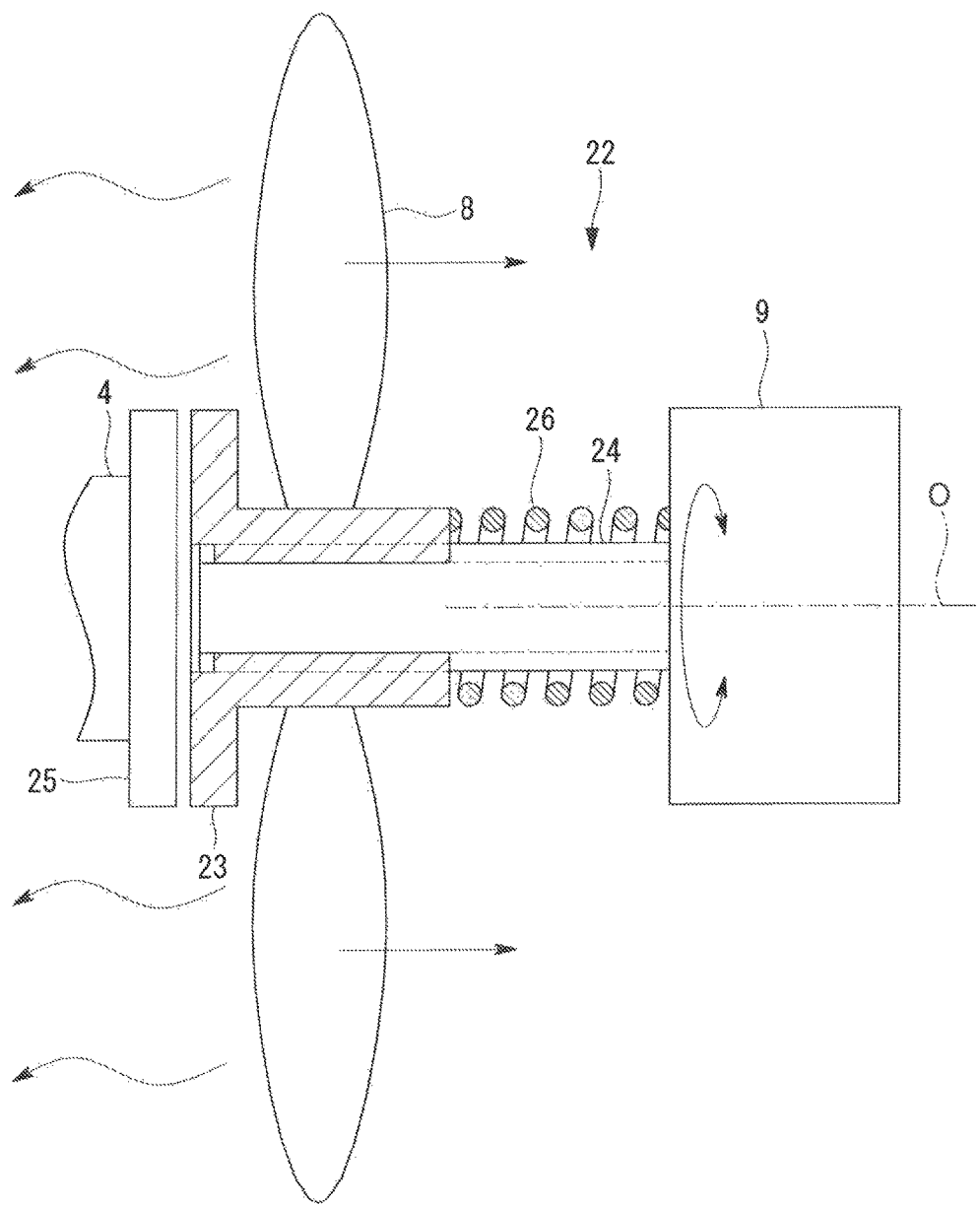
FIG. 7 is a diagram illustrating a decoupled state at the coupling unit of the electric motor in FIG. 5.

In the present embodiment, as illustrated in FIGS. 5 to 7, the coupling unit 22 includes a movable body (movable unit) 23 configured to be moved by wind generated by the cooling fan 6, and the rotor 5 and the impeller 8 are selectively coupled and decoupled by movement of the movable body 23.

Specifically, as illustrated in FIG. 6, the impeller 8 integrally fixed to the movable body 23 is provided to a shaft 24 of the fan motor 9 in a manner movable in a longitudinal direction. The coupling unit 22 includes part of the impeller (movable unit) 8, a friction contact unit 25 fixed to the rotor 5, and a coil spring (energizing member) 26 configured to apply energizing force to press the impeller 8 against the friction contact unit 25.

When the cooling fan 6 is actuated to rotate the impeller 8, cooling air flows toward the rotor 5 and the stator 2 as indicated by an arrow in FIG. 7. Accordingly, the impeller 8 receives wind in an opposite direction, in other words, in a direction departing from the rotor 5 and the stator 2, and becomes separate from the friction contact unit 25.

In the electric motor 21 thus configured according to the present embodiment, the impeller 8 is maintained in close contact with the friction contact unit 25 by energizing force of the coil spring 26 when the fan motor 9 of the cooling fan 6 is stopped and the rotor 5 is stopped or rotating at low speed as illustrated in FIG. 6. Thus, when the rotor 5 and the impeller 8 are coupled by the coupling unit 22 and the impeller 8 is immobilized, the immobilization is canceled by rotation of the rotor 5 at high torque, thereby allowing the impeller 8 to rotate.

When the fan motor 9 is actuated to rotate the impeller 8 at high speed, reaction force of wind applies to the impeller 8 and moves the impeller 8 in a direction departing from the friction contact unit 25 as illustrated in FIG. 7. Accordingly, the rotor 5 and the impeller 8 are decoupled to allow the fan motor 9 to rotate the impeller 8 without restriction by the rotor 5, thereby sufficiently removing heat generated at the rotor 5 and the stator 2.

Thus, the present embodiment can couple and decouple the rotor 5 and the impeller 8 without using any dedicated power nor any dedicated rotation sensor.

From the above-described embodiment, the following invention is derived.

An aspect of the present invention provides an electric motor including a stator, a rotor provided rotatably about a predetermined rotational axis line relative to the stator, a cooling fan configured to rotate an impeller through a fan motor fixed to the stator, and a coupling unit configured to detachably couple the rotor and the impeller of the cooling fan. The coupling unit couples the rotor and the impeller while the fan motor is stopped, and decouples the rotor and the impeller after the fan motor starts.

According to the present aspect, a load connected with the rotor can be rotated to perform work by rotating the rotor about the predetermined rotational axis line relative to the stator. When the fan motor is actuated to rotate the impeller, heat generated at the stator and the rotor can be removed by external air sucked by the impeller.

In this case, when dust and mist are sucked together with the external air sucked upon the actuation of the cooling fan, the dust and mist accumulates and potentially immobilizes the cooling fan. In such a case, when the rotor and the impeller are coupled by the coupling unit while the fan motor is stopped, the impeller can be rotated by rotational force of the rotor, thereby canceling the immobilization of the cooling fan.

When the fan motor starts, the coupling unit decouples the rotor and the impeller. This prevents rotation of the rotor from being encumbered by rotation of the fan motor, which allows sufficient cooling to be performed through rotation of the impeller.

Thus, according to the present aspect, when the cooling fan becomes immobilized, the immobilization can be canceled to prevent overheating without performing cleaning and replacement of the cooling fan.

In the above-described aspect, the electric motor may further include a rotation detection unit configured to detect rotation of the fan motor, and the coupling unit may be electrically controlled to decouple the rotor and the impeller when rotation of the fan motor is detected by the rotation detection unit.

With this configuration, the coupling unit couples the rotor and the impeller when the fan motor is not rotating, and is electrically controlled to decouple the rotor and the impeller when rotation of the fan motor is detected by the rotation detection unit. This more reliably achieves selective coupling and decoupling between the rotor and the impeller.

In the above-described aspect, the coupling unit may include a movable unit configured to be moved by centrifugal force of rotation of the fan motor, and the rotor and the impeller may be selectively coupled and decoupled by movement of the movable unit.

With this configuration, when the fan motor is not rotating, the movable unit of the coupling unit is positioned at a predetermined position and the rotor and the impeller are coupled by the coupling unit. When the fan motor rotates and the centrifugal force of the rotation increases accordingly, the movable unit is moved to decouple the rotor and the impeller. In this manner, the rotor and the impeller can be selectively coupled and decoupled without using any dedicated power nor any dedicated rotation sensor.

In the above-described aspect, the coupling unit may include a movable unit configured to be moved by wind from the cooling fan, and the rotor and the impeller may be selectively coupled and decoupled by movement of the movable unit.

With this configuration, when the fan motor is not rotating, the movable unit of the coupling unit is positioned at a predetermined position and the rotor and the impeller are coupled by the coupling unit. When the fan motor rotates and wind generated by rotation of the impeller increases, the movable unit is moved to decouple the rotor and the impeller. In this manner, the rotor and the impeller can be selectively coupled and decoupled without using any dedicated power nor any dedicated rotation sensor.

In the above-described aspect, the electric motor may include an energizing member configured to energize the movable unit in a direction to couple the rotor and the impeller.

With this configuration, the movable unit of the coupling unit can be energized by energizing force of the energizing member to be positioned at a predetermined position at which the rotor and the impeller are coupled.

REFERENCE SIGNS LIST 1, 11, 21 electric motor
2 stator
5 rotor
6 cooling fan
7, 12, 22 coupling unit
8 impeller (movable unit)
9 fan motor
10 rotation sensor (rotation detection unit)
13, 23 movable body (movable unit)
15, 26 coil spring (energizing member)
O rotational axis line

The invention claimed is:

1. An electric motor comprising:
a stator;
a rotor provided rotatably about a predetermined rotational axis line relative to the stator;
a cooling fan configured to rotate an impeller through a fan motor fixed to the stator; and
a clutch unit configured to detachably couple the rotor and the impeller of the cooling fan,
wherein the clutch couples the rotor and the impeller while the fan motor is stopped, and decouples the rotor and the impeller after the fan motor starts.

2. The electric motor according to claim 1, further comprising a sensor configured to detect rotation of the fan motor,
wherein the clutch is electrically controlled to decouple the rotor and the impeller when rotation of the fan motor is detected by the sensor.

3. The electric motor according to claim 1, wherein the clutch includes a movable body configured to be moved by centrifugal force of rotation of the fan motor, and the rotor and the impeller are selectively coupled and decoupled by movement of the movable body.

4. The electric motor according to claim 1, wherein the clutch includes a movable body configured to be moved by wind from the cooling fan, and the rotor and the impeller are selectively coupled and decoupled by movement of the movable body.

5. The electric motor according to claim 3, further comprising a spring configured to energize the movable body in a direction to couple the rotor and the impeller.

* * * * *